United States Patent
Chen et al.

(10) Patent No.: US 11,995,015 B2
(45) Date of Patent: May 28, 2024

(54) DATA PROCESSING DEVICE AND METHOD FOR TRANSMITTING DATA OVER A BUS

(71) Applicant: Infineon Technologies AG, Neubiberg (DE)

(72) Inventors: Ning Chen, Munich (DE); Jens Rosenbusch, Munich (DE)

(73) Assignee: Infineon Technologies AG, Neubiberg (DE)

( * ) Notice: Subject to any disclaimer, the term of this patent is extended or adjusted under 35 U.S.C. 154(b) by 24 days.

(21) Appl. No.: 17/684,634

(22) Filed: Mar. 2, 2022

(65) Prior Publication Data

US 2022/0283970 A1 Sep. 8, 2022

(30) Foreign Application Priority Data

Mar. 5, 2021 (DE) ...................... 10 2021 105 402.8

(51) Int. Cl.
*G06F 13/362* (2006.01)
*H04L 9/32* (2006.01)

(52) U.S. Cl.
CPC .......... *G06F 13/362* (2013.01); *H04L 9/3278* (2013.01)

(58) Field of Classification Search
CPC .............................. G06F 13/362; H04L 9/3278
USPC .................................................. 710/110, 313
See application file for complete search history.

(56) References Cited

U.S. PATENT DOCUMENTS

| | | | | |
|---|---|---|---|---|
| 5,003,593 A | * | 3/1991 | Mihm, Jr. ............. | H04L 9/0833 380/282 |
| 5,367,695 A | * | 11/1994 | Narad .................. | G06F 13/4027 370/402 |
| 5,699,426 A | * | 12/1997 | Tsukamoto ............. | H04L 65/70 375/E7.017 |
| 5,761,309 A | * | 6/1998 | Ohashi ................. | G06Q 20/341 713/159 |
| 7,069,590 B1 | * | 6/2006 | Malvar ................. | H04N 5/913 380/223 |
| 8,290,150 B2 | * | 10/2012 | Erhart .................... | H04L 9/3249 713/186 |
| 8,386,990 B1 | * | 2/2013 | Trimberger ........... | H01L 23/544 326/38 |

(Continued)

FOREIGN PATENT DOCUMENTS

DE 102006053918 A1 5/2008

*Primary Examiner* — Paul R. Myers
(74) *Attorney, Agent, or Firm* — Eschweiler & Potashnik, LLP

(57) ABSTRACT

Systems, methods, circuits, and devices for data protection are provided. In one example, a data processing device incudes a Physical Unclonable Function (PUF) source that is configured to generate PUF values, a bus, a plurality of bus access components that are configured to access the bus, and a masking information generation circuit. The masking information generation circuit is configured to generate masking information for at least one pair of bus access components using at least one PUF value and to transmit said information to the bus access components. The pair is configured in such a way that one bus access component masks the data according to the masking information generated for the pair before the data is sent over the bus and the other bus access component de-masks the data received over the bus according to the masking information generated for the pair.

15 Claims, 7 Drawing Sheets

(56) References Cited

U.S. PATENT DOCUMENTS

| | | | | |
|---|---|---|---|---|
| 8,516,269 B1* | 8/2013 | Hamlet | G06F 21/445 | 713/180 |
| 8,667,265 B1* | 3/2014 | Hamlet | H04L 9/0866 | 713/185 |
| 8,711,656 B1* | 4/2014 | Paulson | H04B 5/0031 | 367/135 |
| 8,848,905 B1* | 9/2014 | Hamlet | H04L 9/3278 | 726/20 |
| 9,197,422 B2* | 11/2015 | Irwin | H04L 9/0866 | |
| 9,225,512 B1* | 12/2015 | Trimberger | H04L 9/0866 | |
| 9,495,627 B1* | 11/2016 | Annunziata | G11C 11/161 | |
| 10,044,514 B1* | 8/2018 | Peterson | H04L 9/0894 | |
| 10,742,406 B2* | 8/2020 | Pisasale | H04L 9/0643 | |
| 2002/0153998 A1* | 10/2002 | Litwin, Jr. | H04B 3/54 | 380/255 |
| 2003/0163551 A1* | 8/2003 | Riordan | H04W 12/35 | 709/219 |
| 2006/0018481 A1* | 1/2006 | Nagano | H04L 63/068 | 380/270 |
| 2006/0153156 A1* | 7/2006 | Wentink | H04W 8/22 | 370/254 |
| 2006/0209584 A1* | 9/2006 | Devadas | H04L 9/0838 | 365/52 |
| 2008/0028226 A1* | 1/2008 | Brocker | H04L 63/08 | 713/182 |
| 2008/0170695 A1* | 7/2008 | Adler | H04L 9/3066 | 380/277 |
| 2008/0175190 A1* | 7/2008 | Lee | H04L 65/61 | 370/328 |
| 2010/0322418 A1* | 12/2010 | Potkonjak | H04L 9/0866 | 380/278 |
| 2012/0257757 A1* | 10/2012 | Gessner | H04L 9/083 | 380/282 |
| 2013/0061006 A1 | 3/2013 | Hein | | |
| 2013/0094648 A1* | 4/2013 | Goettfert | H04L 9/0643 | 380/28 |
| 2013/0298211 A1* | 11/2013 | M'Raihi | H04L 63/08 | 726/7 |
| 2014/0093074 A1* | 4/2014 | Gotze | G06F 21/73 | 380/45 |
| 2014/0205089 A1* | 7/2014 | Irwin | H04L 9/0819 | 380/44 |
| 2014/0270177 A1* | 9/2014 | Brickell | H04L 9/3278 | 380/278 |
| 2014/0281495 A1* | 9/2014 | Um | G06F 21/44 | 713/155 |
| 2015/0195258 A1 | 7/2015 | Kohiyama | | |
| 2015/0271147 A1* | 9/2015 | Tanizawa | H04L 9/0852 | 713/171 |
| 2016/0080153 A1* | 3/2016 | Suzuki | G09C 1/00 | 713/194 |
| 2016/0110130 A1* | 4/2016 | Kan | G11C 16/0408 | 711/163 |
| 2016/0156476 A1* | 6/2016 | Lee | H04L 9/0866 | 380/44 |
| 2016/0323096 A1* | 11/2016 | Kara-Ivanov | H04L 9/0861 | |
| 2016/0323736 A1 | 11/2016 | Donahue et al. | | |
| 2016/0364583 A1* | 12/2016 | Benoit | H04L 9/3278 | |
| 2017/0111178 A1* | 4/2017 | Winkelvos | H04L 9/3268 | |
| 2017/0134175 A1* | 5/2017 | Skudlarek | H04L 9/3278 | |
| 2019/0116028 A1* | 4/2019 | Liu | H04L 9/3278 | |
| 2019/0116052 A1* | 4/2019 | Kim | H04L 9/3278 | |
| 2019/0306136 A1 | 10/2019 | David et al. | | |
| 2019/0342090 A1* | 11/2019 | Pisasale | H04L 9/0662 | |
| 2019/0342104 A1* | 11/2019 | Adams | H04L 9/0822 | |
| 2020/0007319 A1 | 1/2020 | Herzerg et al. | | |
| 2020/0195446 A1* | 6/2020 | Lepoint | H04L 63/0435 | |
| 2020/0287716 A1* | 9/2020 | Zitlaw | H04L 63/068 | |
| 2021/0281431 A1* | 9/2021 | Swaminathan | G06F 12/1483 | |
| 2021/0304533 A1* | 9/2021 | Ohashi | H04W 12/06 | |
| 2022/0043937 A1* | 2/2022 | Spalding | G06F 18/22 | |
| 2022/0292203 A1* | 9/2022 | Severns-Williams | G06F 21/602 | |

\* cited by examiner

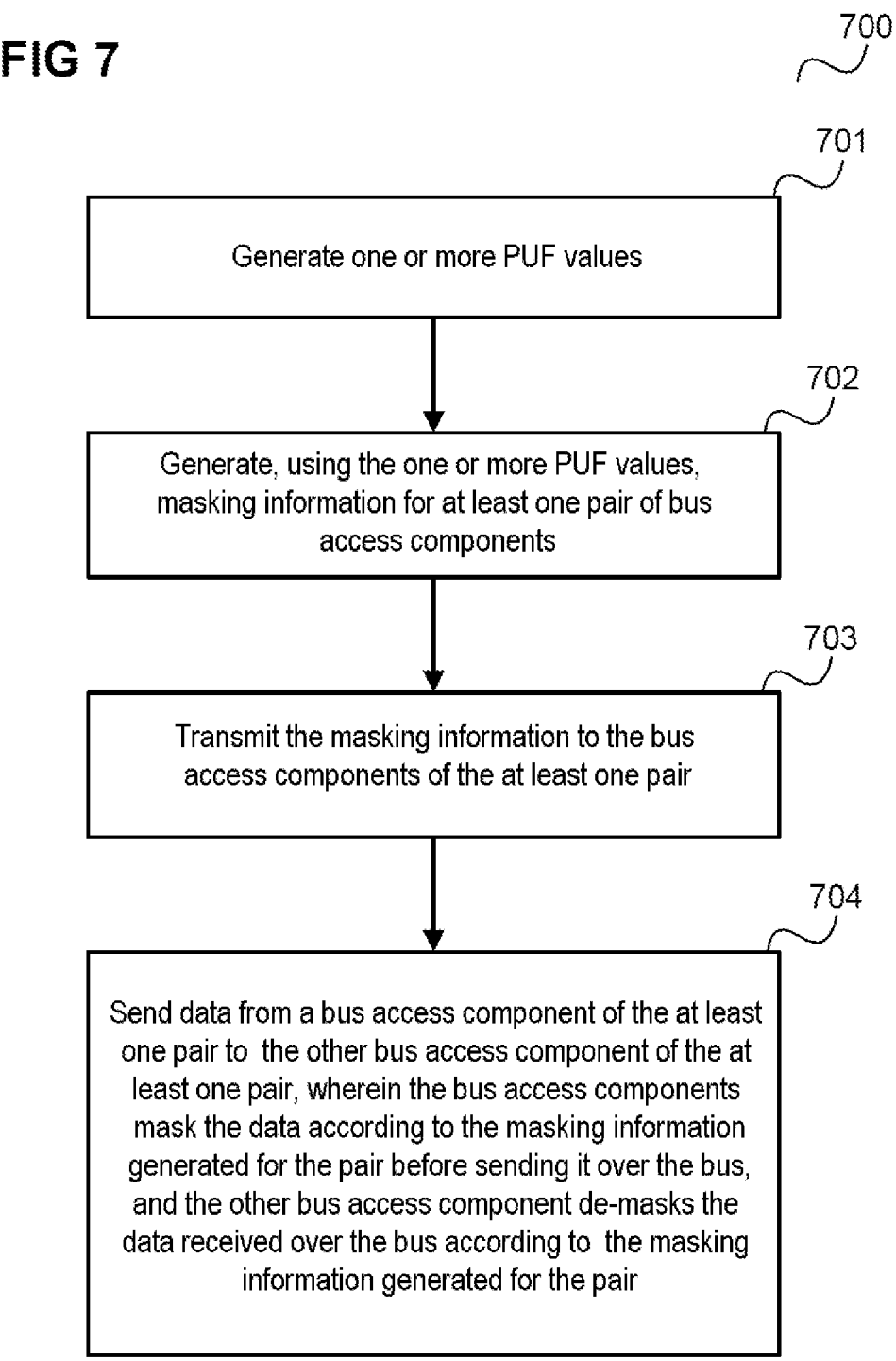

DATA PROCESSING DEVICE AND METHOD FOR TRANSMITTING DATA OVER A BUS

REFERENCE TO RELATED APPLICATION

This Application claims the benefit of German Application number 10 2021 105 402.8, filed on Mar. 5, 2021, the contents of which are hereby incorporated by reference in their entirety.

BACKGROUND

The disclosure is related to general data processing devices and methods for sending data over a bus.

In an electronic data processing device, such as a microcontroller, components typically communicate over a common bus. Since a successful attack on the bus in such an architecture by an attacker could potentially compromise the confidentiality of data exchanged between each pair of components, mechanisms which ensure the confidentiality of data exchanged over a bus are desirable in the case that an attacker gains access to the bus.

BRIEF DESCRIPTION OF THE DRAWINGS

The figures do not reflect the actual proportions, but are intended to illustrate the principles of the various exemplary embodiments. In the following text various examples are described with reference to the following figures.

FIG. 7 shows a flow chart which outlines an example method for sending data over a bus, in accordance with various aspects described.

DETAILED DESCRIPTION

The following detailed description refers to the enclosed figures, which show details and examples. These examples are described in sufficient detail to enable the person skilled in the art to embody the invention. Other examples are also possible, and the examples can be modified in terms of their structural, logical and electrical aspects without deviating from the subject matter of the invention. The different examples are not necessarily mutually exclusive, but different examples can be combined. For the purposes of this description, the terms "connected", "attached" and "coupled" are used to describe both a direct and an indirect connection, as well as a direct or indirect coupling.

Figure 1:
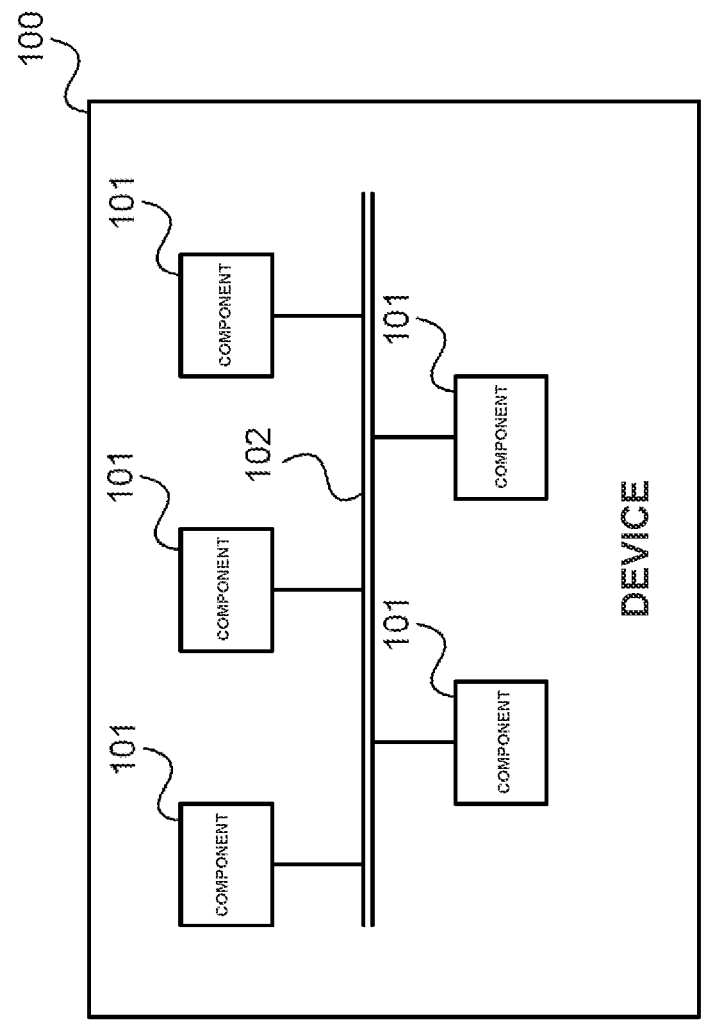
FIG. 1 illustrates an example data processing device, in accordance with various aspects described.

FIG. 1 illustrates an example data processing device 100.

The data processing device 100 is, for example, a microcontroller, such as a microcontroller or an MCU (microcontroller unit) for the automotive sector, but also for other applications such as aviation or industry. However, the data processing device 100 can also be a different kind of data processing device, for example a computer such as a desktop computer or a laptop computer, or even a smartphone or tablet.

The data processing device 100 includes a plurality of components 101. Examples of components 101 are a CPU, one or more cache memories (e.g., a data cache memory or an instruction cache memory), a DMA (Direct Memory Access) unit, a flash memory, a SRAM (Static Random Access Memory), a debug/trace module, or a bridge (e.g., to a peripheral bus).

The data processing device 100 has a bus 102 and the components 101 are configured to access the bus in order to exchange data (in the form of messages) with each other. They are therefore also referred to as bus access components or as (bus) end points (EP).

According to one example, when two (i.e. a pair of) components 101 communicate over the bus 102, one of the components acts as the master (bus master) and the other acts as the slave (bus slave).

In many applications, it is desirable that the bus 102 be secure, so that the confidentiality of the data exchanged over the bus is protected.

For example, if the components 101 and the bus 102 are a bus system (or a bus architecture) with a shared bus with M master components (i=[0 . . . (M−1)]) and S slave components (j=[0 . . . (S−1)]), it is desirable that each master component is able to protect the confidentiality of the data, when the master component sends and/or receives data from a specific subset of the slave components.

For example, an attacker hacking the bus and gaining access to all bus information could pose a risk to the confidentiality of the data. For protection, the information obtained by the attacker should be unusable or the data should be hidden, for example, by means of appropriate disinformation measures.

One option is the cryptographic encryption of the data transmitted on the bus by the sending component and the corresponding cryptographic decryption by the receiving component. This is independent of the bus architecture and typically focuses only on specific data to be protected. However, the cryptographic encryption and decryption of data is a computationally intensive task.

Disclosed herein are data protection systems, circuits, devices, and methods for protecting data transmitted on a bus. In one example, the data to be sent is masked by the sender and de-masked by the receiver. Masking and de-masking (e.g. an exclusive OR combination with a mask) can be performed very quickly, for example, without causing an additional delay on the bus (and thus a corresponding change of the bus protocol, if necessary).

The mask (or, more generally, the masking information) is generated according to various examples by a masking information generation circuit based on one or more PUF (Physical Unclonable Function) values the masking information generation circuit receives from a PUF source (sometimes referred to herein as non-clonable information). For example, the masking information generation circuit can generate the masking information individually for each master-slave pair (i.e., master component and slave component pair) or individually for each master component and serves as a global generation and distribution entity for the masking information in the bus architecture. The PUF source can be any kind of PUF source for a chip, for example, the PUF values can be given from the initial states of the SRAM after a reset or can be determined from the samples of a ring oscillator.

Generating masking information based on one or more PUF values means the masking information is specific to the respective microcontroller (e.g. chip-specific) and protects against an attacker hacking the masking mechanism, as can be the case with a masking algorithm that is used identically on several chips.

A first example is described below, in which common masking information is used for all components 101, also referred to below as a (masking) token, which is specific to the data processing device (e.g. microcontroller-specific or chip-specific).

Figure 2:
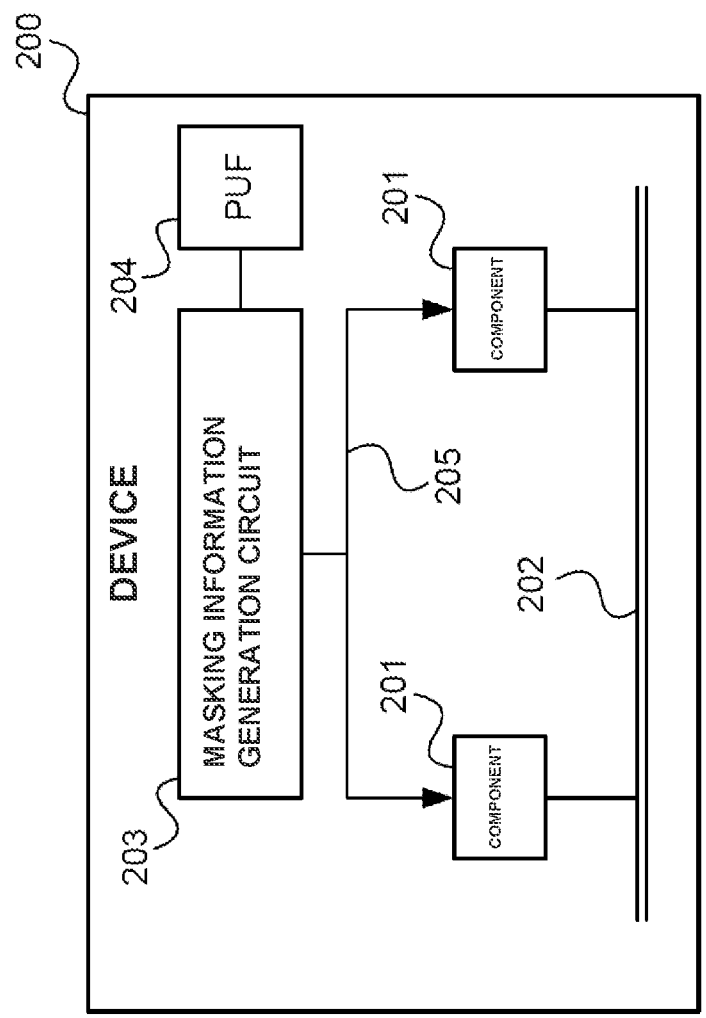
FIG. 2 illustrates an example data processing device with a first exemplary bus architecture, in accordance with various aspects described.

FIG. 2 shows an example data processing device 200 with a bus architecture according to the first example.

The data processing device 200 has data processing components 201 (for example, corresponding to the data processing components 101) and a bus 202 (for example, corresponding to the bus 102). The data processing device 200 also comprises a masking information generation circuit 203.

The masking information generation circuit 203 receives PUF values from a PUF source 204 and, using said PUF values, generates a masking token which is specific to the data processing device 200.

A masking token can be static and generated uniquely and can be used for the entire service life of a data processing device (e.g. a chip). This, however, carries the risk that an attacker might discover this by trying different data patterns.

To mitigate this risk, according to various examples, the masking information generation circuit 203 may generate masking tokens dynamically. For example, a generated masking token is used until it is replaced by a newly generated masking token. For example, the masking information generation circuit 203 can generate a masking token each time a power-on reset is performed. The masking information generation circuit 203 can also generate new masking tokens (which replace existing masking tokens) between two resets, for example at random time intervals, in order to reduce the risk of an attacker from gaining information using statistical analysis.

The masking information generation circuit 203 distributes a generated masking token to the components 201 via a separate channel (e.g. a separate cable or a physical conductor other than conductor paths used for the bus) 205. In other words, the masking information generation circuit 203 does not use the bus to transmit the masking information.

According to an example, the masking information generation circuit 203 transmits the masking token to each component individually.

If a first of the components 201 wants to send data to a second of the components 202, the first component scrambles the data using the masking token.

Figure 3:
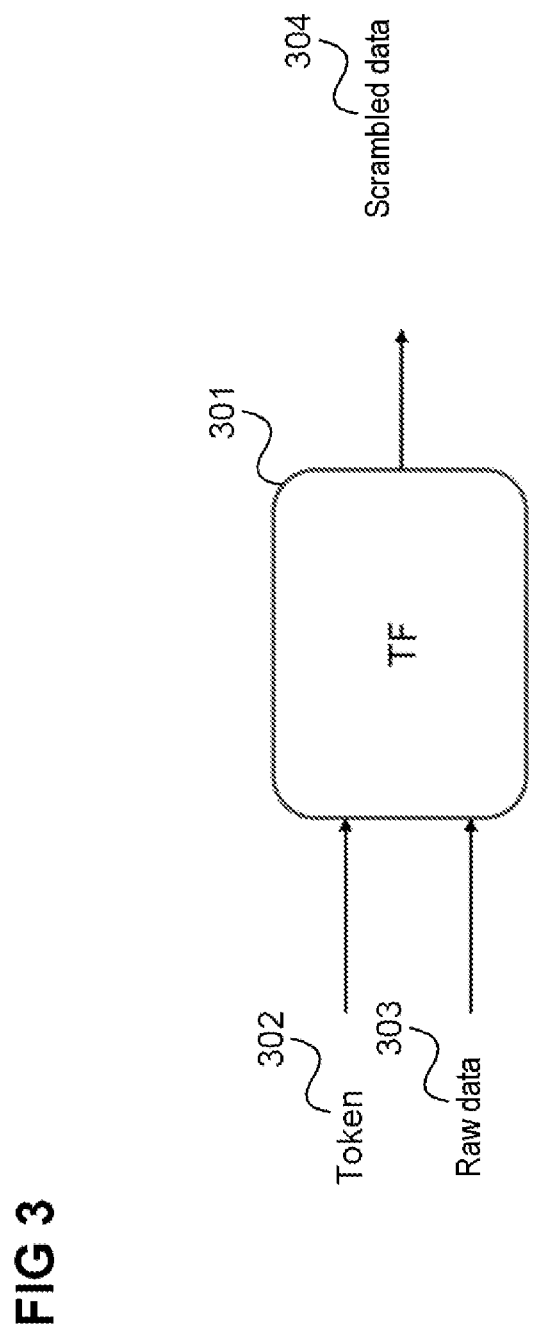
FIG. 3 illustrates an example data scrambling process for data to be sent, in accordance with various aspects described

FIG. 3 illustrates an example process of scrambling data to be sent.

The sending component implements a transformation function (or masking function) 301 to which the sending component supplies the masking token 302 and the (raw) data to be sent 303 and from this, generates the scrambled data 304. This is done, for example, in the data transmission phase of the bus protocol used.

One example of the transformation function is an exclusive OR combination of the raw data 303 with the masking token, where, for example, the raw data is broken down into multiple words which have the same length as the masking token (in this case, a masking word). However, any reversible combinatorial logic for the transformation function can be used, for example, which does not insert any additional delay (of one or more bus clock cycles) and thus does not interfere with the bus protocol used.

If an attacker gains access to the bus, they would only see scrambled (i.e. masked) data. If the attacker does not know the masking token, the confidentiality of the data is thus ensured. Since the masking token is specific to the data processing device and cannot be cloned, an attacker cannot use the masking token for another data processing device either, even if they manage to discover the masking token on a data processing device.

In the first example described above, the masking token is the same for all bus access components, as explained. This provides protection, as described above, assuming that an attacker is able to access all information directly from the bus. However, the most likely case of a successful attack on the bus system by an attacker is that the attacker has access to a component, such as a bus slave (i.e. a slave component), such as a debug/trace module. An attacker could then use the identification of a master component to filter information on the bus (i.e., filter out data sent from that master component, as the sender identification is typically sent along with it). If the transformation function for the bus protocol for descrambling the received data in the slave component is transparent, the confidentiality of the data is compromised because the data is first descrambled and then present in the slave component (e.g., debug/trace module)

Therefore, according to a second example, the masking information generation circuit 203 assigns a different masking token to each bus master (i.e. each master component). This is explained below with reference to FIG. 4.

Figure 4:
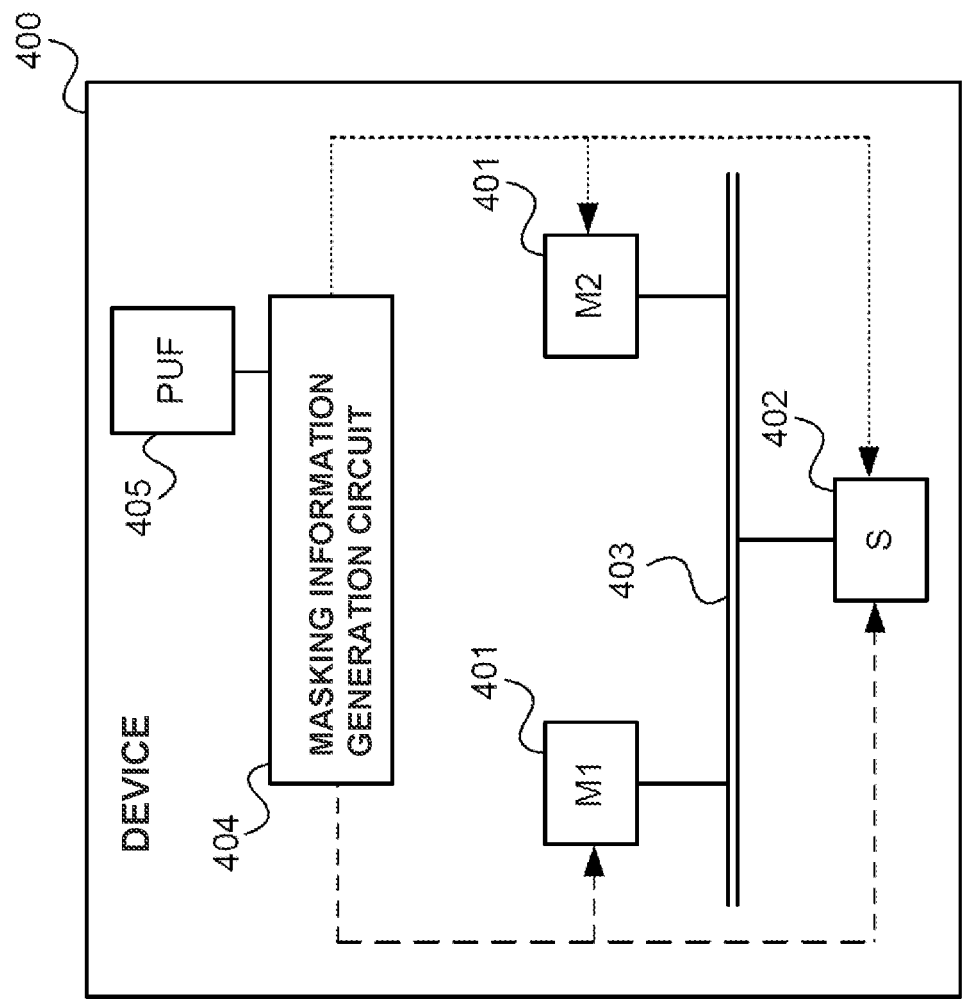
FIG. 4 illustrates an example data processing device with a second exemplary bus architecture, in accordance with various aspects described.

FIG. 4 shows an example data processing device 400 with a bus architecture according to the second example.

The data processing device 400 has two bus masters 401 and one bus slave 402 (for example, corresponding to the data processing components 101) and a bus 403 (for example, corresponding to the bus 102). The data processing device 200 also has a masking information generation circuit 404 and a PUF source 405.

As explained with reference to FIG. 2, the masking information generation circuit generates 404 masking tokens from PUF values. In contrast to the first example, the masking information generation circuit 404 generates the masking tokens individually for the bus master 401, i.e. supplies the bus master 401 with different masking tokens. If the bus slave 402 is intended to communicate with both bus masters 401, the masking information generation circuit 404 supplies the bus slave 402 with the masking tokens of both bus masters.

This means that in order to be able to communicate with all bus masters 401 (e.g. receive data from all bus masters), the bus slave 402 must hold all the corresponding masking tokens. Depending on the bus, this can be a significant amount of data. For example, in the worst case, this could be 64*64 bits for a Shared Resource Interconnection bus (SRI) slave and 64*32 bits for a Flexible Peripheral Interconnect (FPI) slave, assuming that the bus slave is intended to support communication with the maximum of 64 bus masters. In practice, however, the number of masking tokens to be retained can be significantly lower, since often only certain bus masters have access to certain bus slaves.

With regard to the scenario described above of a hacked debug/trace module, it is important to note that, in the context of the second example, if no debugging is required for a particular bus master 401, the masking information generation circuit 404 also does not transmit the masking token assigned to the bus master 401 (and used by the bus master for scrambling data) to the debug/trace module. This means that the debug/trace module is not able to descramble data sent from this bus master and the attacker does not have access to sensitive data from this bus master.

In general, the masking information generation circuit 404 can be configured not to send a masking token assigned to a bus master to a bus slave if no data is to be sent from the bus master to the bus slave. The masking information generation circuit 404 can also assign a specific masking token to each bus master and bus slave pair (or more generally, each pair of bus access components). In this case, the masking information generation circuit 404 can be configured to send the masking token to only the two bus access components of the pair.

This means that an attacker cannot receive confidential information from a bus master that is not intended for the hacked bus slave (even if, for example, the attacker manipulates the identification of the bus master from which the bus slave reads messages from the bus). This reduces the risk of an attack in which an attacker forwards confidential data to an unintended receiver (e.g. bus slave) by manipulating a target address.

As explained in the context of the first example, the masking information generation circuit 404 can generate and distribute new masking tokens dynamically (and especially between two resets), thereby replacing existing masking tokens. For this purpose, the masking information generation circuit 404 can be permanently in operation and, for example, generate and distribute masking tokens at random time intervals.

In this example, the masking information generation circuit 404 is configured, for example, to distribute the masking tokens quickly (e.g. within one bus clock cycle), so that the masking tokens for pairs of bus access components have the same status (i.e., are synchronized). Alternatively, for example, a mechanism may be provided that allows a sender (i.e., a transmitting bus access component) to inform the receiver (i.e., a receiving bus access component) that the sender has used a new masking token.

The masking information generation circuit 404 does not need to generate tokens for all bus masters at the same time (if masking information generation circuit does this between two resets), but can randomly select a subset of the bus masters to make attacks more difficult for an attacker who attempts to obtain information through statistical analysis.

The distribution of masking tokens to bus access components by means of a central masking information generation circuit 404 can be considered a client/server model for the distribution of masking tokens. This requires fewer connections and routing requirements (linear versus squared) compared to a peer-to-peer model for distributing masking tokens.

Depending on the application, the following features may be disruptive for the second example described above:

Many masking tokens (and thus a large amount of data) are distributed and dynamically updated and synchronized;

The memory requirements in the bus masters and bus slaves can be high, as described above (e.g., 64*64 bits for 64 bus masters).

The third example described below is based on the following observations.

It is typically not necessary for all data words sent according to the bus protocol to be encrypted. For example, with a cryptographic key, it is sufficient to invert a single bit to render the key unusable. For other data to be protected, it is also an option to invert all bits except for a specific bit.

It is not typically necessary to involve all bus masters and all bus slaves in the protection mechanism at all times.

The third example is therefore based on the fact that the masking information generation circuit 404 selects one or more bus masters sequentially at random and specifies one or more bit positions to be inverted (instead of transmitting entire masking words each time).

Figure 5:
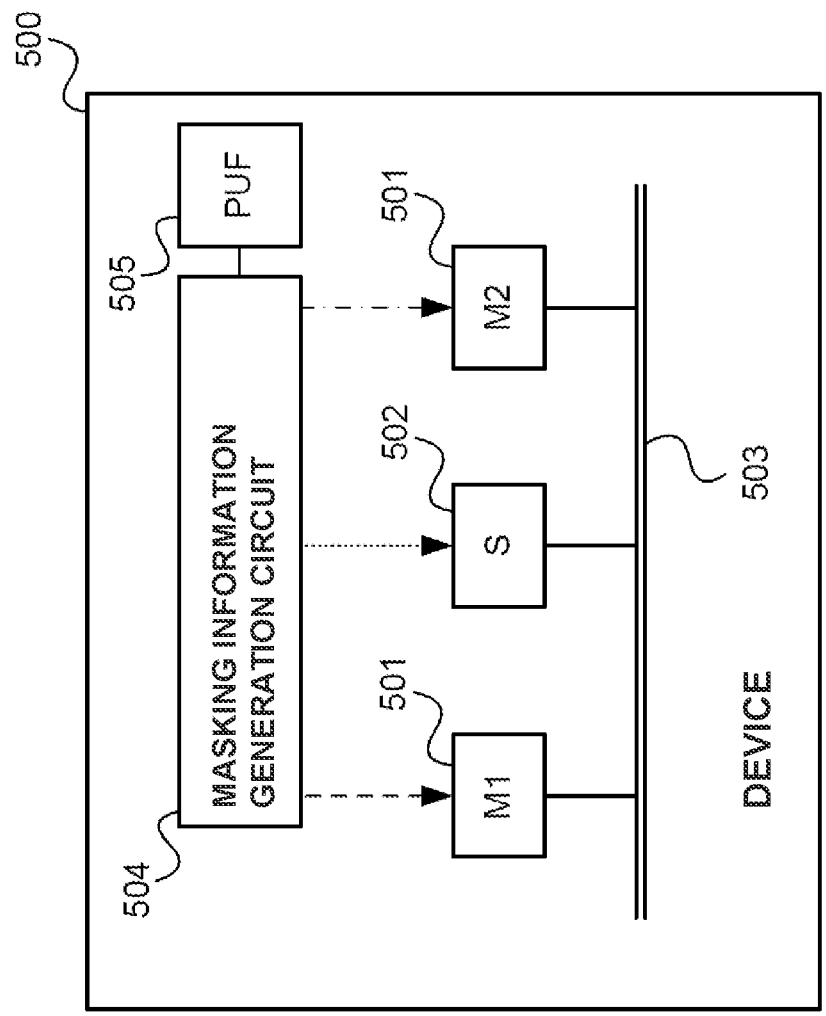
FIG. 5 illustrates an example data processing device with a third exemplary bus architecture, in accordance with various aspects described.

FIG. 5 shows an example data processing device 500 with a bus architecture according to the third example.

The data processing device 500 has two bus masters 501 and one bus slave 502 (for example, corresponding to the data processing components 101) and one bus 503 (for example, corresponding to the bus 102). The data processing device 500 also has a masking information generation circuit 504 and a PUF source 505.

The masking information generation circuit 504 randomly selects one bus master 501 and one bit position to be inverted (within the message or data word length of the bus protocol) at a time. Random selection is based on one or more PUF values (e.g., as a seed for a random number generator). The masking information generation circuit 504 then sends as a masking token Token=(TAG_ID, BIT_POSITION) to all bus access components (regardless of whether they are a bus master or bus slave). Where TAG_ID is the identification of the randomly selected bus master and BIT_POSITION is the randomly selected bit position.

A sending bus master 501 responds to receiving this masking token in such a way that if TAG_ID is the identification of the sending bus master 501, the sending bus master inverts the bit at the BIT_POSITION in data words to be sent.

A bus slave 502 responds to receiving the masking token in such a way that when the bus slave 502 listens to the bus and when the bus slave 502 receives a message from the bus 503 and the TAG_ID from the masking token matches the sender identification of the message, the bus slave 502 inverts the message (or the data word or data words contained therein) at the BIT_POSITION.

With 64 bus masters in the bus system and a data word length of 64-bit (from which the bit to be inverted can be selected), 12 bits are sufficient for coding the token.

The masking information generation circuit 504 randomly generates the masking token as described above, to reduce the risk of an attacker being able to gain information using statistical analysis (for example, if they become aware of which bus master is sending).

In addition, as in the second example, an attacker may be prevented from gaining access to (all) the bus master messages by hacking a bus slave, by the masking information generation circuit 504 deciding which bus slaves (or, in general, which bus endpoints) the masking information generation circuit 504 sends the token to. For example, the masking information generation circuit 504 may be configured not to send a masking token with a specific TAG_ID to bus slaves that do not need to communicate with the bus master with the TAG_ID.

The masking information generation circuit 504 can intentionally send invalid tokens (with the wrong bit position for bus masters that do not need to communicate with the bus master with the TAG_ID) to these bus slaves (such as a debug/trace module that does not need to debug certain bus masters), so that they are not able to de-mask data from the bus masters.

In the third example, the information on the bus is masked and certain bus slaves (such as a debug/trace module) can be excluded from the de-masking. If an attacker manipulates a bus slave to read messages from a particular bus master from the bus, the bus slave (if the bus slave is excluded) does not have the correct token to de-mask the messages. Similarly, an attacker may not be able to gain access to a message if they manipulated the destination address of a message.

In the described examples, reading from a bus slave by a bus master (i.e., the data transfer from the bus slave to the bus master) can be performed in the same way as writing (i.e., the data transfer from the bus master to the bus slave), wherein in the second and third examples, the bus slave and the bus master use the masking token that is assigned to the bus master. The masking information generation circuit 504 can also provide different masking tokens for writing and reading (and, for example, in the masking token, specify whether the masking token is to be used for writing or reading). The masking information generation circuit 504 may ensure the consistency and synchronization of the masking tokens in the sender and receiver as explained above.

Figure 6:
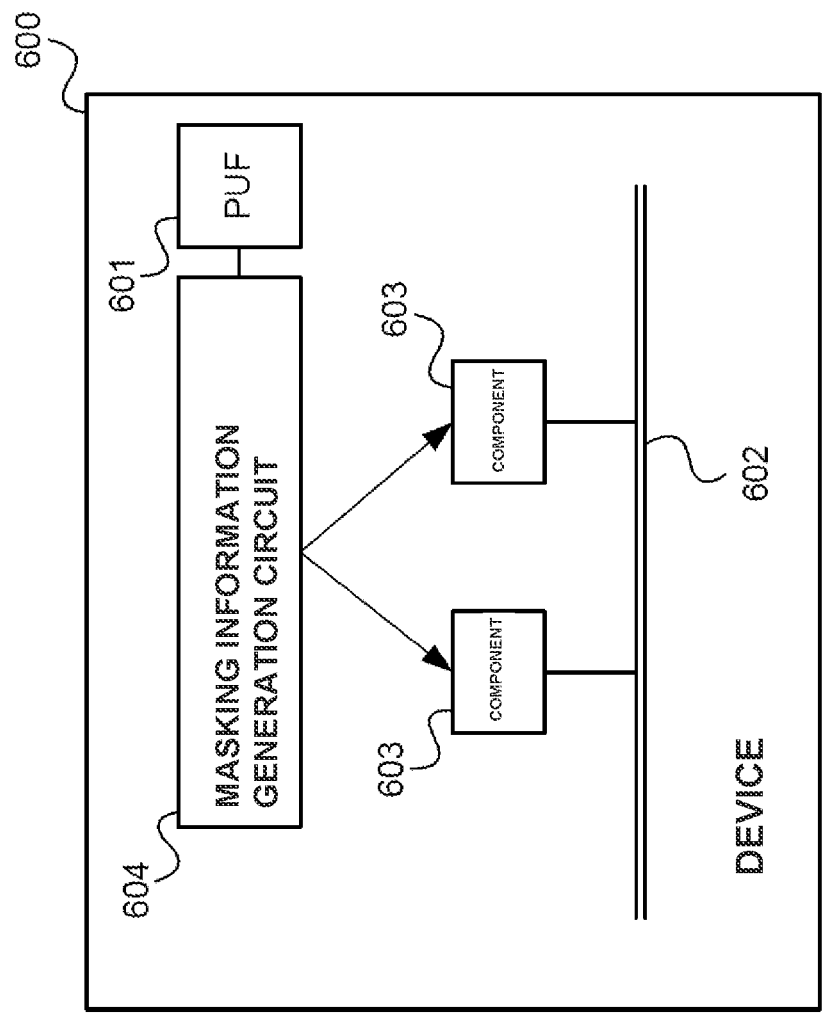
FIG. 6 illustrates an example data processing device, in accordance with various aspects described.

In summary, according to various examples a data processing device as shown in FIG. 6 is provided.

FIG. 6 shows an example data processing device 600.

The data processing device 600 has a PUF source 601 that is configured to generate PUF values.

The data processing device 600 also has a bus 602, a plurality of bus access components 603 that are configured to access the bus 602, and a masking information generation circuit 604 that is configured to generate masking information for at least one pair of bus access components 603 using at least one PUF value generated by the PUF source 601 and to transmit said information to bus access components 603 of the at least one pair.

For the at least one pair the bus access components 603 are configured in such a way that one bus access component, in order to send data to the other bus access component of the pair, masks the data according to the masking information generated for the pair before the data is sent over the bus, and the other bus access component de-masks the data received over the bus according to the masking information generated for the pair.

In other words, according to various examples, information indicating how to mask data to be transmitted on a bus is obtained from a central unit of PUF values.

According to various examples, a chip-specific virtual private network is created between the bus access components (master components and slave components).

This enables a secure bus architecture according to various examples, which may ensure that data transmitted over the bus remains confidential even if an attacker gains access to the bus (i.e., even if they can read all the information transmitted over the bus). According to various examples, the approach can be seamlessly integrated into existing bus protocols and can be implemented simply without requiring complex calculations.

FIG. 7 shows a flow chart 700 which illustrates an example method for sending data over a bus.

In 701 one or more PUF values are generated.

In 702, using one or more PUF values, masking information is generated for at least one pair of bus access components that access a bus.

In 703, the masking information is transmitted to the bus access components of at least one pair.

In 704, data is sent from a bus access component of at least one pair to the other bus access component of the at least one pair, wherein the bus access components mask the data according to the masking information generated for the pair before the data is sent over the bus, and the other bus access component de-masks the data received over the bus according to the masking information generated for the pair.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, circuitries, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to provide safety management on a per-application group basis according to embodiments and examples described herein.

Example 1 is a data processing device including a Physical Unclonable Function (PUF) source that is configured to generate PUF values; a bus; a plurality of bus access components that are configured to access the bus; and a masking information generation circuit that is configured, using at least one PUF value generated by the PUF source, to generate masking information for each of a plurality of pairs of bus access components and to transmit said information for each pair to the bus access components of the pair, wherein for each pair the bus access components are configured in such a way that one bus access component, in order to send data to the other bus access component of the pair, masks the data according to the masking information generated for the pair before the data is sent over the bus, and the other bus access component de-masks the data received over the bus according to the masking information generated for the pair.

Example 2 includes the subject matter of example 1, wherein the masking information generated for all pairs of the plurality of pairs is identical, wherein the masking information generated for all pairs of the plurality of pairs is different or wherein the masking information generated for two pairs is identical if the two pairs in a bus access component match, and is different otherwise.

Example 3 includes the subject matter of example 1, wherein each pair consists of a master bus component and a slave bus component.

Example 4 includes the subject matter of example 3, wherein the masking information generated for two pairs is identical if the two pairs in the bus master component match and is different otherwise.

Example 5 includes the subject matter of example 4, wherein the masking information generation circuit is configured to broadcast the masking information together with an identification of the bus master component, which indicates that the masking information has been generated for pairs containing the identified bus master component.

Example 6 includes the subject matter of example 4, wherein each bus slave is configured to listen to the bus when a bus master sends data over the bus, to identify the bus master and if the bus slave has masking information that was generated for pairs of bus access components that contain the identified bus master, to receive the data and de-mask the data according to the masking information.

Example 7 includes the subject matter of example 1, wherein the masking information generation circuit is configured to transmit the masking information via a communication channel separate from the communication channel formed by the bus.

Example 8 includes the subject matter of example 1, wherein the masking information generation circuit is configured to transmit the masking information via at least one physical conductor path other than the conductor paths used for the bus.

Example 9 includes the subject matter of example 1, wherein the masking information includes a masking word.

Example 10 includes the subject matter of example 1, wherein masking information specifies at least one data word bit position which is to be inverted to perform masking and de-masking according to the masking information.

Example 11 includes the subject matter of example 10, wherein a number of data word bit positions to be inverted is the same for all pairs of bus access components.

Example 12 includes the subject matter of example 10, wherein the masking information specifies exactly one data word bit position which is to be inverted during masking and de-masking according to the masking information.

Example 13 is a method for transmitting data over a bus, including generating one or more PUF values; using the one or more PUF values to generate masking information for each of a plurality of pairs of bus access components that access a bus; transmitting the masking information to the bus access components of the pair, for each of the plurality of pairs; and sending data for each of at least part of the plurality of pairs from one bus access component of the pair to the other bus access component of the pair, wherein the bus access components mask the data according to the masking information generated for the pair before the data is sent over the bus, and the other bus access component de-masks the data received over the bus according to the masking information generated for the pair.

Example 14 includes the subject matter of example 13, wherein the masking information generated for all pairs of the plurality of pairs is identical, wherein the masking information generated for all pairs of the plurality of pairs is different or wherein the masking information generated for two pairs is identical if the two pairs in a bus access component match, and is different otherwise.

Example 15 includes the subject matter of example 13, wherein masking information specifies at least one data word bit position which is to be inverted to perform masking and de-masking according to the masking information.

Example 16 is a data protection system, including a Physical Unclonable Function (PUF) source that is configured to generate PUF values; and a masking information generation circuit that is configured, using at least one PUF value generated by the PUF source, to generate masking information for each of a plurality of pairs of bus access components and to transmit said information for each pair to the bus access components of the pair.

Example 17 includes the subject matter of example 16, wherein the masking information generated for all pairs of the plurality of pairs is identical, wherein the masking information generated for all pairs of the plurality of pairs is different or wherein the masking information generated for two pairs is identical if the two pairs in a bus access component match, and is different otherwise.

Example 18 includes the subject matter of example 16, wherein each pair consists of a master bus component and a slave bus component.

Example 19 includes the subject matter of example 18, wherein the masking information generated for two pairs is identical if the two pairs in the bus master component match and is different otherwise.

Example 20 includes the subject matter of example 16, wherein masking information specifies at least one data word bit position which is to be inverted to perform masking and de-masking according to the masking information.

In the following text, various exemplary embodiments are specified.

Exemplary embodiment 21 is a data processing device as described above with reference to FIG. 6.

Exemplary embodiment 22 is the data processing device according to exemplary embodiment 21, wherein the masking information generation circuit is configured, using at least one PUF value generated by the PUF source, to generate masking information for each of a plurality of pairs of bus access components and to transmit said information for each pair to the bus access components of the pair, and wherein for each pair the bus access components are configured in such a way that one bus access component, in order to send data to the other bus access component of the pair, masks the data according to the masking information generated for the pair before it is sent over the bus, and the other bus access component de-masks the data received over the bus according to the masking information generated for the pair.

Exemplary embodiment 23 is the data processing device according to exemplary embodiment 22, wherein the masking information generated for all pairs of the plurality of pairs is identical, wherein the masking information generated for all pairs of the plurality of pairs is different or wherein the masking information generated for two pairs is identical if the two pairs in a bus access component match, and is different otherwise.

Exemplary embodiment 24 is the data processing device according to example 22 or 23, wherein each pair consists of a master bus component and a slave bus component.

Exemplary embodiment 25 is the data processing device according to any one of exemplary embodiments 22 to 24, wherein the masking information generated for two pairs is identical if the two pairs in the bus master component match and is different otherwise.

Exemplary embodiment 26 is the data processing device according to exemplary embodiment 25, wherein the masking information generation circuit is configured to broadcast the masking information together with an identification of the bus master component, which indicates that the masking information has been generated for pairs containing the identified bus master component.

Exemplary embodiment 27 is the data processing device according to exemplary embodiment 25 or 26, wherein each bus slave is configured to listen to the bus when a bus master sends data over the bus, to identify the bus master and if it has masking information that was generated for pairs of bus access components that contain the identified bus master, to receive the data and de-mask it according to the masking information.

Exemplary embodiment 28 is the data processing device according to any one of exemplary embodiments 21 to 27, wherein the masking information generation circuit is configured to transmit the masking information via a communication channel separate from the communication channel formed by the bus.

Exemplary embodiment 29 is the data processing device according to any one of exemplary embodiments 21 to 28, wherein the masking information generation circuit is configured to transmit the masking information via at least one physical conductor path other than the conductor paths used for the bus.

Exemplary embodiment 30 is a data processing device according to any one of the exemplary embodiments 21 to 29, wherein the masking information comprises a masking word.

Exemplary embodiment 31 is the data processing device according to any one of exemplary embodiments 21 to 30, wherein masking information specifies at least one data word bit position, which is to be inverted during masking and de-masking according to the masking information.

Exemplary embodiment 32 is the data processing device according to exemplary embodiment 31, wherein the number of data word bit positions to be inverted is the same for all pairs of bus access components.

Exemplary embodiment 33 is the data processing device according to exemplary embodiment 31 or 32, wherein the masking information specifies exactly one data word bit position which is to be inverted during masking and de-masking according to the masking information.

Exemplary embodiment 34 is a method for transmitting data over a bus, as described with reference to FIG. 7.

Exemplary embodiment 35 is the method according to exemplary embodiment 34, wherein, using at least one generated PUF value, masking information is generated for each of a plurality of pairs of bus access components and is transmitted for each pair to the bus access components of the pair and wherein for each pair one bus access component, in order to send data to the other bus access component of the pair, masks the data according to the masking information generated for the pair before it is sent over the bus, and the other bus access component de-masks the data received over the bus according to the masking information generated for the pair.

Exemplary embodiment 36 is the method according to exemplary embodiment 35, wherein the masking information generated for all pairs of the plurality of pairs is identical, wherein the masking information generated for all pairs of the plurality of pairs is different or wherein the masking information generated for two pairs is identical if the two pairs in a bus access component match, and is different otherwise.

Exemplary embodiment 37 is the method according to exemplary embodiment 35 or 36, wherein each pair consists of a master bus component and a slave bus component.

Exemplary embodiment 38 is the method according to any one of exemplary embodiments 35 to 37, wherein the masking information generated for two pairs is identical if the two pairs in the bus master component match and is different otherwise.

Exemplary embodiment 39 is the method according to exemplary embodiment 38, wherein the masking information is broadcast together with an identification of the bus master component, which indicates that the masking information has been generated for pairs containing the identified bus master component.

Exemplary embodiment 40 is the method according to exemplary embodiment 38 or 39, wherein each bus slave listens to the bus when a bus master sends data over the bus, identifies the bus master, and if it has masking information that was generated for pairs of bus access components that contain the identified bus master, receives the data and de-masks it according to the masking information.

Exemplary embodiment 41 is the method according to any one of exemplary embodiments 34 to 40, wherein the masking information is transmitted via a communication channel separate from the communication channel formed by the bus.

Exemplary embodiment 42 is the method according to any one of exemplary embodiments 44 to 41, wherein the masking information is transmitted via at least one physical conductor path other than the conductor paths used for the bus.

Exemplary embodiment 43 is the method according to any one of exemplary embodiments 34 to 42, wherein the masking information comprises a masking word.

Exemplary embodiment 44 is the method according to any one of exemplary embodiments 34 to 43, wherein masking information specifies at least one data word bit position, which is to be inverted during masking and de-masking according to the masking information.

Exemplary embodiment 45 is the method according to exemplary embodiment 44, wherein the number of data word bit positions to be inverted is the same for all pairs of bus access components.

Exemplary embodiment 46 is the method according to exemplary embodiment 44 or 45, wherein the masking information specifies exactly one data word bit position which is to be inverted during masking and de-masking according to the masking information.

In the present disclosure like reference numerals are used to refer to like elements throughout, and wherein the illustrated structures and devices are not necessarily drawn to scale. As utilized herein, terms "module", "component," "system," "circuit," "circuitry," "element," "slice," and the like are intended to refer to a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuitries can reside within a process, and circuitry can be localized on one computer and/or distributed between two or more computers. A set of elements or a set of other circuitry can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include field gates, logical components, hardware encoded logic, register transfer logic, one or more processors therein to execute software and/or firmware that confer(s), at least in part, the functionality of the electronic components.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof. As used herein the term "or" includes the option of all elements related by the word or. For example A or B is to be construed as include only A, only B, and both A and B. Further the phrase "one or more of" followed by A, B, or C is to be construed as including A, B, C, AB, AC, BC, and ABC Although the invention has mainly been shown and described by reference to specific embodiments, it should be understood by those familiar with the technical field that numerous changes can be made with regard to its design and details without departing from the nature and scope of the invention, as defined by the following claims. The scope of the invention is therefore defined by the attached claims and it is intended that any changes that fall within the literal meaning or equivalent scope of the claims are included.

What is claimed is:

1. A data processing device comprising:
   a Physical Unclonable Function (PUF) source that is configured to generate PUF values;
   a bus;
   a plurality of bus access components that are configured to access the bus, the bus access components arranged in pairs comprising a master bus component and slave bus component; and
   a masking information generation circuit that is configured, using at least one PUF value generated by the PUF source, to
      generate masking information for each of the master bus components, wherein the masking information generated for two pairs is identical if the two pairs in the master bus component match and is different otherwise; and,
      for each master bus component, broadcast the masking information for the master bus component together with an identification of the master bus component to at least two slave bus components belonging to a pair with the master bus component, which indicates that the masking information has been generated for pairs containing the identified master bus component,
   wherein for each pair the bus access components are configured in such a way that one bus access component, in order to send data to the other bus access component of the pair, masks the data according to the masking information generated for the pair before the data is sent over the bus, and the other bus access component de-masks the data received over the bus according to the masking information generated for the pair.

2. The data processing device of claim 1, wherein the masking information generated for all pairs of the plurality of bus access components is different or wherein the masking information generated for two pairs is identical if the two pairs in a bus access component match, and is different otherwise.

3. The data processing device of claim 1, wherein the masking information generated for two pairs is identical if the two pairs in the master bus component match and is different otherwise.

4. The data processing device of claim 3, wherein each slave bus component is configured to listen to the bus when a master bus component sends data over the bus, to identify the master bus component and if the slave bus component has masking information that was generated for pairs of bus access components that contain the identified master bus component, to receive the data and de-mask the data according to the masking information.

5. The data processing device of claim 1, wherein the masking information generation circuit is configured to transmit broadcast the masking information via a communication channel separate from the communication channel formed by the bus.

6. The data processing device of claim 1, wherein the masking information generation circuit is configured to broadcast the masking information via at least one physical conductor path other than the conductor paths used for the bus.

7. The data processing device of claim 1, wherein the masking information comprises a masking word.

8. The data processing device of claim 1, wherein masking information specifies at least one data word bit position which is to be inverted to perform masking and de-masking according to the masking information.

9. The data processing device of claim 8, wherein a number of data word bit positions to be inverted is the same for all pairs of bus access components.

10. The data processing device of claim 8, wherein the masking information specifies exactly one data word bit position which is to be inverted during masking and de-masking according to the masking information.

11. A method for transmitting data over a bus, comprising:
    generating one or more PUF values;
    using the one or more PUF values to generate masking information for each master bus component of a plurality of pairs of bus access components that access a bus, wherein each pair of bus access components comprises a master bus component and slave bus component, wherein the masking information generated for two pairs is identical if the two pairs in the master bus component match and is different otherwise; and
    for each master bus component, broadcasting the masking information for the master bus component together with an identification of the master bus component to at least two slave bus components belonging to a pair with the master bus component, which indicates that the masking information has been generated for pairs containing the identified master bus component.

12. The method of claim 11, wherein the masking information generated for all pairs of the plurality of pairs is different or wherein the masking information generated for two pairs is identical if the two pairs in a bus access component match, and is different otherwise.

13. The method of claim 11, wherein masking information specifies at least one data word bit position which is to be inverted to perform masking and de-masking according to the masking information.

14. A data protection system, comprising:
    a Physical Unclonable Function (PUF) source that is configured to generate PUF values; and
    a masking information generation circuit that is configured to,
       using at least one PUF value generated by the PUF source, generate masking information for each master bus component of a plurality of pairs of bus access components, wherein each pair of bus access components comprises a master bus component and slave bus component, wherein the masking information generated for two pairs is identical if the two pairs in the master bus component match and is different otherwise; and for each master bus component, broadcast the masking information for the master bus component to at least two slave bus components belonging to a pair with the master bus component, which indicates that the masking information has been generated for pairs containing the identified master bus component.

15. The data protection system of claim 14, wherein masking information specifies at least one data word bit position which is to be inverted to perform masking and de-masking according to the masking information.

* * * * *